United States Patent [19]

Austin

[11] Patent Number: 4,477,011
[45] Date of Patent: Oct. 16, 1984

[54] CONTINUOUS CLADDING OF ALUMINUM STRIP

[75] Inventor: Derek T. Austin, Kingston, Canada

[73] Assignee: Alcan International Limited, Montreal, Canada

[21] Appl. No.: 416,502

[22] Filed: Sep. 10, 1982

[51] Int. Cl.³ ............................................. B23K 20/04
[52] U.S. Cl. .................. 228/173 A; 228/265; 228/235; 228/263.17; 228/243
[58] Field of Search .................. 228/235, 158, 173 A, 228/176, 18, 190, 233, 265, 243, 263.17, 127; 428/612

[56] References Cited

U.S. PATENT DOCUMENTS

| | | | |
|---|---|---|---|
| 2,214,618 | 9/1940 | Kenyon et al. | 228/158 |
| 2,753,623 | 7/1956 | Boessenkool et al. | 228/243 X |
| 3,300,838 | 1/1967 | Slater et al. | 228/235 X |
| 3,436,804 | 4/1969 | Broverman | 228/263.17 X |
| 3,496,621 | 2/1970 | Winter | 428/612 |
| 3,734,384 | 5/1973 | Kozak et al. | 228/235 X |
| 4,213,558 | 7/1980 | Hirobe et al. | 228/176 |
| 4,343,425 | 10/1982 | Wagner et al. | 228/117 |

Primary Examiner—Nicholas P. Godici
Assistant Examiner—P. Weston Musselman, Jr.
Attorney, Agent, or Firm—Cooper, Dunham, Clark, Griffin & Moran

[57] ABSTRACT

A method of continuously cladding aluminum strip by jointly warm rolling a core strip and an aluminum cladding strip in contact therewith, to bond the strip, wherein the core and cladding strips are advanced to the mill at respectively different line speeds over a looper roll disposed ahead of the mill and above the pass line of the mill, the cladding being also advanced around an ironing roll disposed ahead of the looper roll such that the cladding undergoes a double bend over the two rolls and is in contact with the core strip as and after it passes the looper roll but is out of contact with the core strip ahead of the looper roll. One or both sides of the core strip can be clad; for two-sided cladding, two cladding strips are respectively advanced over separate ironing rolls and into contact with the opposite surfaces of the strip.

12 Claims, 2 Drawing Figures

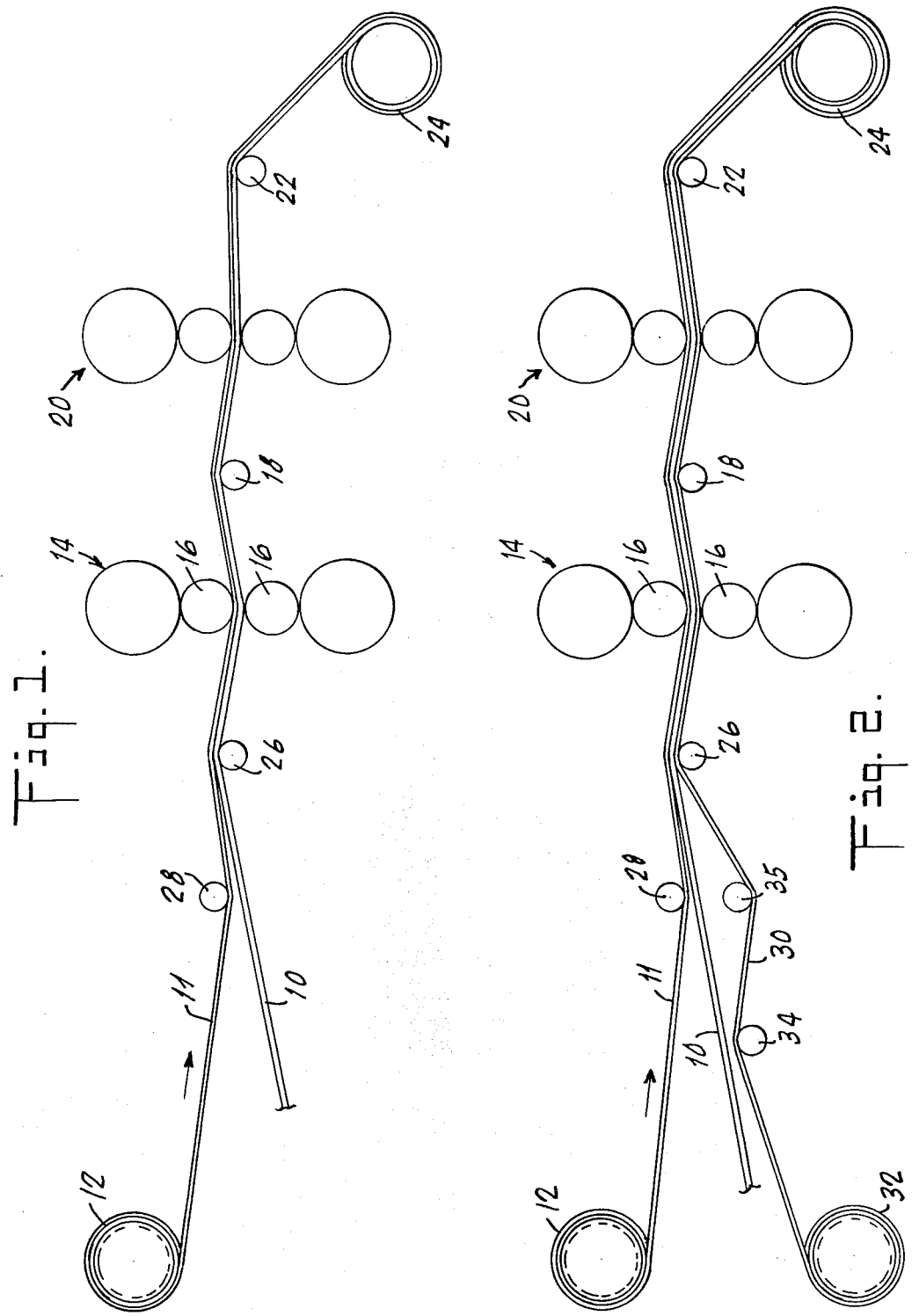

CONTINUOUS CLADDING OF ALUMINUM STRIP

BACKGROUND OF THE INVENTION

This invention relates to the continuous cladding of aluminum strip, and more particularly to methods of continuously cladding one or both major surfaces of an aluminum core strip with an aluminum cladding strip or strips. The term "aluminum," as used herein, embraces alloys of aluminum as well as pure aluminum metal.

For various purposes, it is frequently desired to provide aluminum sheet or strip with an outer cladding layer of aluminum on one or both major surfaces thereof. This may be done, for example, to achieve a product affording the combined advantages of particular properties of the substrate or core metal and particular surface characteristics of the cladding. Commonly, the core and cladding are respectively constituted of different alloys, although in some cases it would be desirable to provide a core and cladding of the same alloy, e.g. to enable utilization of the core in applications for which the surface condition of the core is unacceptable.

Cladding has conventionally been performed by placing a rectangular plate of the cladding alloy on one or both major surfaces of a rectangular ingot of the core alloy and warm rolling the plate or plates and ingot together to produce a clad slab which can thereafter be reduced to a desired final gauge by further rolling operations. Satisfactory bonding of the core and cladding can be achieved in this way, but the procedure is slow and time-consuming. The advent of continuous strip casting as a production technique has made especially desirable the performance of cladding in a continuous manner, e.g. in line with the strip caster, to diversify the potential end uses of continuously strip-cast products and to take advantage of the benefits (from a production standpoint) of the continuous operation afforded by strip casting.

Continuous strip casting, as herein contemplated, involves supplying molten metal to a casting zone defined between more or less closely spaced, externally chilled, moving endless surfaces such as the surfaces of continuously driven steel belts or rolls. The metal emerges from the casting zone as a continuous, relatively thin strip, at least externally solidified. The as-cast strip is reduced by passage through a hot-rolling mill in line with the caster, or if sufficiently thin it may be directly cold rolled without preliminary hot reduction. In any event, the small thickness of the as-cast strip advantageously decreases the extent of hot reduction necessary for fabrication of sheet products, as compared with conventionally cast sheet ingot. Examples of currently commercially available strip casting apparatus are Hazelett twin-belt casters and Hunter-Douglas twin-roll casters.

It has been proposed, for example in U.S. Pat. No. 4,213,558, to clad continuously cast aluminum strip by bringing thin-gauge rolled aluminum cladding strip into contact with one or both major surfaces of as-cast core strip and passing the core and cladding strip together through a warm-rolling mill. In the procedure specifically described in the aforesaid patent, the core and cladding strips are brought into contact between pinch rolls, and are fed synchronously to the mill after being maintained in extended contact ahead of the mill (for example by passage between arrays of rolls) to achieve thorough preheating of the cladding strip or strips by the hot as-cast strip.

Heretofore, however, the continuous cladding of cast strip has been attended with serious problems, related to the requirements that the cladding strip or strips be maintained in proper alignment with the core strip, that the cladding strip or strips be in smooth continuous contact with the core strip when the strips pass through the warm rolling mill, and that the cladding strip or strips be uniformly bonded to the core by the warm-rolling operation. Curvature or other deformation of the cladding strip as paid out from a coil, and local or general bonding failures (whether resulting from such deformation, or from the layer of oxide unavoidably present on aluminum surfaces, or from other causes) lead to production of excessive scrap. Inhibition of bonding by the oxide layer is particularly acute in the case of certain types of alloys (such as magnesium-containing alloys) and certain core-cladding alloy combinations, and has thus limited the range of alloys and core-cladding alloy combinations to which known continuous cladding procedures are applicable.

It has also been proposed, for example in U.S. Pat. Nos. 3,381,366 and 3,496,621, to clad an aluminum core strip by warm rolling with unheated cladding strips that first come into contact with the preheated core in the nip of the warm-rolling mill (being in contact with the mill rolls before they are in contact with the core) and advance into the nip at a velocity different from that of the core, to achieve a surface speed differential at the point of core-cladding contact in the nip that is stated to enhance bonding; but hot as-cast strip from a continuous strip caster is not specified for the core. Further, it has been proposed, for example in U.S. Pat. No. 4,224,978, and in French Pat. No. 1,364,758, to produce a composite strip by continuously casting aluminum in a strip caster in contact with a cladding strip or strips fed through the strip caster, but these procedures involve core-cladding contact before the core metal solidifies and necessitate special or at least modified strip-casting arrangements.

SUMMARY OF THE INVENTION

The present invention broadly contemplates the provision of a method of continuously cladding aluminum strip by continuously passing a first (core) aluminum strip, and a second (cladding) aluminum strip substantially aligned longitudinally with the first strip in contact with a major surface thereof, concurrently through a nip between paired rolls of a warm-rolling mill for jointly warm rolling the first and second strips to bond them together such that the second strip constitutes a cladding on the first strip major surface. In the method of the invention, the first strip is continuously advanced to the nip at a first line speed along a first free path over a first single roll spaced ahead of the nip with the top of the first roll disposed above the pass line of the mill such that the first strip advances upwardly to the first roll and then downwardly to the nip. Further in accordance with the invention, the second strip is continuously advanced to the nip at a second line speed different from the first line speed along a second free path extending thereto from a locality, ahead of the first roll, at which the second strip is spaced away from the first strip; in this path, the second strip initially advances around and in contact with a second single roll spaced between the aforementioned locality and the first roll, and thereafter advances, in smooth continuous contact with and substantially aligned with the first strip major surface, over the first roll and into the nip, the second strip being longitudinally movable relative to the first strip throughout the extent of the second path.

It will be understood that the term "pass line" as used herein refers to the line, perpendicular to the plane containing the axes of the paired warm mill rolls, extending through (and thus positionally defined by) the nip between these rolls, generally in the direction of warm-strip advance through the nip; typically, the mill rolls have horizontal axes disposed one above another in a common vertical plane, and the pass line of the mill is accordingly a horizontal line through the nip oriented with the direction of strip advance. The term "line speed" refers to the longitudinal linear velocity of the strip. The term "free path" refers to a path in which the strip is not pinched or pressed between paired rolls, and the term "single roll" refers to a roll, in contact with one major surface of a strip, that is not paired with another roll positioned to engage the opposite major strip surface at the same point in the path of strip advance. The "top" and "bottom" of a roll are (in the case of an axially horizontal roll, associated with a mill having a horizontal pass line) the lines of intersection of the roll periphery with the vertical plane containing the roll axis, respectively above and below that axis. All directional expressions ("top," "bottom," "above," "over," "upwardly," "downwardly," etc.) are employed herein with reference to a horizontal pass line, and are intended only to define relative positions and directions, without limiting the practice of the invention to any particular orientation of the cladding line.

In the method of the invention as broadly set forth above, the successive advance of the second or cladding strip around the second roll and (in contact with the first or core strip) over the first roll provides a double bend in the path of advance of the cladding strip to the warm rolling mill. This double bend, together with the full contact established and maintained (by appropriate positioning of the second roll) between the strips as and after they pass over the first roll, assures flat continuous engagement of the cladding strip with the core strip surface when the strips enter the warm rolling mill; the second roll functions as an ironing roll to eliminate anticlastic curvature of the cladding strip, which is paid off from a coil, while the first roll, functioning as a looper roll, completes the removal of cladding curvature or deformation relative to the core as well as imparting tension to the core strip ahead of the nip. At the same time, the free-path feed of the strips to the mill and the consequently permitted velocity differential between the strips entering the mill nip disrupts the oxide surface layers on the strips to afford assured bonding between the strips. These results are achieved with as few rolls as possible in contact with the strips ahead of the mill, to facilitate maintenance of proper alignment between the core and cladding strips as the cladding operation proceeds.

The present method is suitable for use to clad continuously cast strip, e.g. in line with a strip caster, with the cladding applied either after preliminary hot-rolling of the cast strip or (preferably, in at least many instances) directly to the as-cast strip, while the latter is still sufficiently hot from the casting operation to provide the heat required for the warm-rolling step of the method. It is found that the method of the invention enables satisfactory cladding with a wide variety of core and/or cladding alloys, including alloys (and core-cladding alloy combinations) as to which successful cladding has heretofore been difficult or impossible to achieve owing to inhibition of bonding by surface oxides. In addition to providing the aforementioned core-cladding line speed differential whereby (as explained above) oxide surface layers are disrupted, the present method enables the cladding to be maintained in a cool condition, out of contact with the heated as-cast strip, until it reaches the looper roll in the cladding path just prior to the warm-rolling mill, in order to minimize oxide formation, i.e. in the case of cladding alloys (such as magnesium-containing alloys) which oxidize rapidly when heated. Thus, for example, a core strip can be clad with a magnesium-containing alloy, and indeed a core strip can be clad with a cladding strip of the same alloy as the core, even if the alloy contains magnesium.

The speed differential between core and cladding strips is maintained by application of appropriate back tension to the coil from which the cladding strip is paid off for advance along the aforementioned free path to the warm-rolling mill nip, the amount of such back tension being selected with reference to alloy composition, coil diameter, and metal thickness. Typically, the cladding strip is a rolled strip having a gauge substantially less than that of the core strip to which it is applied. The line speed of the cladding strip advancing to the warm-rolling mill may be more or less than that of the core strip. For example, when the cladding has a lower tensile strength and hardness than that of the core, it will advance at a slower rate, but the line speed of the cladding strip will exceed that of the core strip when the cladding alloy has a higher tensile strength and hardness than the core. The difference in speeds of the cladding strip and the core strip thus allows a limited selection of the cladding thickness.

In a currently preferred embodiment, with the cladding strip advancing to the mill above the core strip so as to clad the upwardly facing major surface of the core, the second or ironing roll is so positioned (i.e. to impart the requisite double bend to the cladding strip, in cooperation with the first or looper roll, and to assure that the cladding strip is in full and flat contact with the core strip as and after the strips pass over the first roll) that the bottom of the second roll is below the level of the top of the first roll; but the cladding strip is kept out of contact with the core strip ahead of the first or looper roll. The cladding strip passes over the core strip in close contact after the second bend, when it has passed under the ironing roll and over the looper roll. At this point it is in high tension over the core strip for a brief period just prior to entry into the mill bite and before bonding some abrasion of the surfaces to be welded will occur. This surface abrasion just prior to bonding is advantageous as it helps to break up the metal oxide surfaces before the mill roll bite.

The invention further contemplates simultaneously cladding both surfaces of a core strip, viz. with two cladding strips respectively advancing to the mill above and below the core strip, and with a separate single ironing roll provided for each cladding strip such that each cladding strip has a double bend imparted thereto as it advances into contact with a surface of the core strip ahead of the mill. As incorporated in the preferred embodiment just described, cladding of the downwardly facing surface of the core strip may be performed (in accordance with current preference) by passing the lower cladding strip successively around two single ironing rolls disposed to cooperatively impart the double bend to the lower cladding strip.

After initial bonding (welding) of the core strip and cladding strip or strips in the warm rolling mill, the clad composite strip may be passed through a second mill in line with the first for further warm reduction.

Further features and advantages of the invention will be apparent from the detailed description hereinbelow set forth, together with the accompanying drawing.

BRIEF DESCRIPTION OF THE DRAWING

FIG. 1 is a simplified schematic view of a continuous strip-cladding line for practice of the method of the present invention in an illustrative embodiment to clad one surface of a core strip; and FIG. 2 is a view, similar to FIG. 1, showing performance of two-sided cladding by the method of the invention.

DETAILED DESCRIPTION

The invention will be described, with reference to the drawing, as embodied in procedure for cladding hot as-cast aluminum strip 10 produced on a continuous strip caster (not shown) such as a Hazelett twin-belt caster, it being understood, however, that the present method is broadly applicable to the cladding of continuously cast aluminum strip produced by any belt, slab, or drum caster, in as-cast condition (no pretreatment of the cast surface being necessary), or indeed to the cladding of other aluminum strip, e.g. continuously cast strip which has been subjected to preliminary reduction by hot rolling. Belt casting apparatus, and the continuous casting of aluminum strip therewith, are well known in the art and accordingly need not be described. By way of example, the as-cast strip 10 may have a substantially uniform thickness within the range between about ½ inch and about ¾ inch (although thicker and thinner strip can be clad by the method of the invention) and a width of as much as about four to six feet or even more.

In the embodiment of the invention illustrated in FIG. 1, an aluminum cladding strip 11 is applied to one major surface of the core strip 10. The cladding strip, which may be rolled sheet aluminum, typically (though not necessarily) of a gauge equal to not more than about one tenth the thickness of the strip 10, is provided as a coil 12. The width of the cladding strip is slightly less (e.g. one or two inches less) than the width of the core strip 10.

The cladding strip 11 is bonded to the aforementioned major surface of the core strip 10 by warm rolling in a four-high rolling mill 14 of conventional character. In this warm-rolling step, the two strips are continuously passed concurrently (i.e. in the same direction) and in surface-to-surface contact with each other through the nip defined between paired rolls 16 of the mill 14; thereby the strips are simultaneously bonded together and reduced in thickness, e.g. as much as 50%, or even more. Beyond the mill 14, the bonded strips advance over a looper roll 18 and thence through the nip of a second conventional four-high warm-rolling mill 20, after which the clad strip product is led over a guide roll 22 and coiled as indicated at 24.

The mill 14 comprises four axially horizontal rolls arranged with their axes lying in a common vertical plane. The pass line of the mill, defined by the nip between the paired rolls 16, is thus a horizontal line extending through the nip and perpendicular to the plane containing the axes of the mill rolls.

Conveniently, though not necessarily, the as-cast strip advances from the caster (which would be disposed to the left of the drawing, in the view of FIG. 1) toward the mill 14 along a substantially horizontal path generally coincident with the pass line of the mill 14. As will be appreciated, the as-cast strip 10 is hot when it emerges from the caster, and is still at a sufficiently elevated temperature (typically or preferably at least about 425° C.) at the mill 14 to supply the requisite heat for the warm-rolling operation; hence there is no need for any auxiliary supply of heat. The temperature of the strip 10 at the mill 14 is dependent, inter alia, on the casting speed, which can be increased or decreased to produce a corresponding increase or decrease in strip temperature. The stated value of 425° C. is a presently preferred minimum value for the strip temperature arriving at the mill 14, to ensure complete bonding between the strips, although in some instances satisfactory bonding can be achieved with somewhat lower strip temperatures.

In accordance with the invention, the strip 10 passes over a first single roll, viz. a looper roll 26, spaced ahead of the mill 14 in the path of strip advance. The looper roll 26 is disposed, in axially parallel relation to the paired mill rolls 16, with the top of the looper roll 26 above the pass line of the mill; it is currently preferred that the top of roll 26 be located about one to two inches above the mill pass line. Accordingly, as the strip 10 approaches the mill 14, it must advance first upwardly over the looper roll 26 and then downwardly to the nip of the mill.

The coil 12 is supported, above the path of advance of the strip 10 (and spaced away from contact with the latter strip), by a suitable and e.g. conventional payoff device (not shown) incorporating a suitable braking system (also not shown), such as a hydraulically adjustable friction brake, for exerting a desired degree of back tension on the cladding strip. Further in accordance with the invention, the cladding strip 11 is led from the coil 12 toward the mill 14 under a second single roll, viz. an ironing roll 28, spaced ahead of the looper roll 26 in the path of advance of the strips 10 and 11 to the mill. The ironing roll 28 is disposed, in axially parallel relation to the roll 26 and the mill rolls, above the advancing strips 10 and 11, with the bottom of the ironing roll below the level of the top of the roll 26 (and thus below the level of the strips passing over roll 26), such that the advancing cladding strip is brought into smooth continuous contact with the upwardly-facing major surface of the core strip 10 as the strip 10 passes over the roll 26, but preferably not ahead of the roll 26, although the strip 11 comes close to the strip 10 while passing around the roll 28. Consequently, the strips 10 and 11 advance over the roll 26 and thence to the mill 14 in full surface-to-surface contact as necessary to achieve the desired bonding of the strips in the hot-rolling step.

It will be seen, from FIG. 1, that the rolls 28 and 26 cooperatively impart a double bend to the cladding strip 11 in the path of advance of the cladding strip to the mill 14; i.e., the advancing cladding strip is bent first around the roll 28 and then around the roll 26 before entering the mill. The roll 28 specifically functions to eliminate anticlastic curvature of the cladding strip and to minimize the effect of nonuniform cladding strip shape. Ahead of the roll 26, however, the path of advance of the strip 11 is above the path of strip 10; hence the cladding strip is not heated by contact with the hot as-cast core strip 10 until it reaches the roller 26. Consequently there is only a relatively brief period during which the strip 10 heats the strip 11 before the strips enter the mill 14, with the advantageous result of minimizing surface oxidation of the cladding, i.e. in the case of cladding alloys (such as magnesium-containing alloys) that oxidize rapidly. The spacing between the looper roll 26 and the mill 14 is selected to maintain a predetermined tension in the strip being rolled; in one example of apparatus arranged for the practice of the present invention, the roll 26 was located four feet ahead of the nip of the mill 14. The ironing roll 28 is positioned a convenient distance ahead of the looper roll 26; in the aforementioned example, the ironing roll 28 was positioned about 17 feet ahead of the nip of the mill.

In the described embodiment of the present method, the strips 10 and 11 are continuously advanced from left to right as seen in FIG. 1, the hot as-cast strip 10 proceeding directly from the caster, at a first line speed, along a first free path spaced beneath roll 28 and passing over roll 26 to the mill 14, and the cladding strip 11 proceeding from the coil 12, at a second line speed different from the first line speed, along a second free path (under roll 28 and over roll 26) to the mill 14. The ironing roll 28 removes anticlastic curvature from the unwinding cladding coil and minimizes the effect of poor strip shape. The line speed differential between the strips is established and maintained by the application of appropriate back tension to the cladding strip as described above; the correct back tension for a particular cladding strip is determined by such factors as the alloy used, coil diameter, and strip thickness, to avoid occurrence of transverse ripples on the clad product (resulting from inadequate back tension) and longitudinal "gull winging" of the cladding strip (resulting from excessive back tension). It has been found that the cladding thickness can be slightly adjusted by the back tension applied, as there is a safe operating range between transverse ripples and "gull winging" for some alloys. In the more difficult alloys, the range between transverse ripples and gull winging is diminished due to the need to accent different entry speeds.

The line speed of the cladding strip may be either slower or faster than that of the core strip 10, depending, for example, on whether the cladding strip is annealed or unannealed. In either event, the differential persists over the full extent of the respective free paths of the two strips into the mill, notwithstanding that the strips are in surface-to surface contact between the roll 26 and the mill; hence the strips slide longitudinally relative to each other and enter the mill at respectively different speeds. This difference in speed promotes breakup of oxide layers on the facing strip surfaces, and thereby (in cooperation with the effect of rolls 28 and 26 in assuring that strip 11 lies flat on strip 10, and the minimization of preheating of strip 11 as described above) enables attainment of satisfactorily full and uniform bonding (welding) between cladding and core as the strips are reduced together in the mill 14, even in the case of alloys (or core-cladding alloy combinations) as to which bonding has heretofore been difficult or impossible to achieve.

Beyond the mill 14, the bonded core-cladding composite strip advances (typically being supported by a run-out table, not shown) over the looper roll 18 to the second mill 20, where it is further reduced. The clad product may then be coiled for use or further (e.g. cold rolling) reduction, as desired.

The cladding strip, as stated, is slightly narrower than the core strip 10 to avoid edge peeling of metal beyond the mill 14. It is, of course, also necessary that the cladding strip be maintained in properly centered relation to the core strip ahead of the mill. Centering corrections during operation can be effected, in known manner, by positional (e.g. angular) adjustment of the coil 12 or the mill rolls. Although the presence of rolls in the path of strip advance tends to interfere with centering corrections, the number of such rolls is minimized, in the present method, insofar as possible consistent with attainment of requisite strip flatness (only the two rolls 28 and 26 being in contact with the strip) and it is therefore feasible to maintain proper strip centering in the aforementioned manner, without resort to edge guides, which can produce undesired folding of strip edges especially if the strip profile exhibits nonuniformities.

Cooling and lubrication, required for the warm mill 14 (as forwarm-rolling mill operations generally) are performed in such manner as to avoid introduction of fluid into any gaps (e.g. edge waves) between the core and cladding strips entering the mill, since the presence of such fluid prevents proper bonding or causes blisters. Specifically, a mist lubricant is used directly on the mill rolls, to prevent any liquid from penetrating between the layers of metal. The roll cooling is achieved on the exit side of the mill, using an enclosed system (not shown) to contain and remove the cooling liquid.

The core strip 10 advancing from the caster is typically supported on a run-off table having rolls ordinarily arranged as a series of sets of rolls tilting downwardly from the sides of the table toward the centerline thereof so as to engage only the side edges of a flat strip. The weight of the hot strip (e.g. at strip thicknesses of one-half to one inch) may, however, cause the strip to sag down the centerline as it moves along the table; in such case, the looper roll 26 functions not only as a tensioning device but also as a levelling roll for the strip 10. The looper roll 18 between the mills 14 and 20 serves to stabilize the tension in the strip between the mill stands, thereby to avoid excessive inter-stand tension that could cause necking or breaking of the strip.

The present method is tolerant of such conditions as nonuniformity of core strip profile or flatness (and consequent edge waves), and uneven thickness and uneven temperature distribution across the as-cast strip 10. Thus, it enables satisfactory cladding to be achieved despite the occurrence of these frequently encountered conditions. The amount of edge scrap that must be trimmed from the clad strip product, i.e. over and above the edge scrap ordinarily trimmed from a hot-rolled unclad strip, is less than 10% of the width rolled. Normal edge trim averages 8%. Cladding trim is at the most 18%.

FIG. 2 illustrates two-sided cladding of an as-cast aluminum strip 10 in accordance with the method of the invention. The cladding of the upwardly facing surface of the strip 10 with a strip 11 is essentially as described above with reference to FIG. 1. The downwardly-facing surface of the strip 10 is clad at the same time, and in like manner, with a second aluminum cladding strip 30 paid off from a coil 32 mounted below and in spaced relation to the strip 10 ahead of the roll 28. The strip 30 advances from coil 32 along a free path to the mill 14 over a third single roll, viz. an ironing roll 34, positioned below (e.g. six inches below) the strip 10 just ahead of roll 28, thence under a fourth single roll 35 spaced vertically beneath roll 28, and finally over roll 26 in smooth continuous contact with the downwardly-facing surface of strip 10. Both cladding strips 11 and 30 preferably come into contact with the core strip 10 only as they pass over the roll 26. The line speed of the strip 30, controlled by application of back tension, e.g. by means of a braking device (not shown) associated with the payoff mounting for coil 32, is maintained at a value different from that of the strip 10, so that the latter strip and the cladding strip 30 enter the nip of the mill 14 in surface-to-surface contact but at respectively different speeds. The top of the ironing roll 34 is disposed above the level of the bottom of the ironing roll 35 to impart a double bend to the advancing strip 30 and to eliminate anticlastic curvature therein. As in the case of the upper cladding, this combination of features achieves satisfactorily uniform contact and bonding of the lower cladding with the strip 10.

With the method of the invention, a wide variety of core-cladding alloy combinations have been successfully produced, including the following:

| Cladding | Core |
|---|---|
| unalloyed Al (AA 1100)* | Al—Mn and Al—Mg—Mn alloys |
| Al—Zn alloy (AA 7072) | Al—Mn and Al—Mg—Mn alloys |
| Al—Si brazing alloys (AA 4045, 4047) | Al—Mg—Mn alloy (AA 3004) |
| AA 3004 | Al—Mg—Mn alloy |
| high purity Al + about 1% Mg (AA 5657) | lower purity Al + Mg and Al—Mg—Mn alloys |

*"AA" numbers refer to Aluminum Association alloy designations. Alloys without AA numbers given are not currently registered with the Aluminum Association.

EXAMPLE

An alloy containing 1.0% (by weight) Mg, 0.65% Fe, 0.60% Mn, 0.26% Si, balance essentially Al, was cast on a twin-belt caster to produce a strip 40 inches wide and one-half inch thick. The as-cast strip was clad with commercial quality rolled AA 7072 alloy strip 39 inches wide and 0.050 inch thick, by the method of the present invention, being rolled through two four-high mills to 0.109 inch gauge coils, to produce 53,105 kg. of clad product. The nominal cladding was 10.7% before rolling and the actual cladding thickness was 8.0 to 8.8% by metallographic examination. No lack of adhesion between layers was detectable. The product was used as skelp to form four-inch pipe.

It is to be understood that the invention is not limited to the procedures and embodiments hereinabove set forth, but may be carried out in other ways without departure from its spirit.

I claim:

1. A method of continuously cladding aluminum strip, comprising
   (a) continuously passing a first aluminum strip, and a second aluminum strip substantially aligned longitudinally with said first strip in contact with a major surface thereof, concurrently through a nip between paired rolls of a warm-rolling mill for jointly warm-rolling the first and second strips to bond them together such that said second strip constitutes a cladding on said first strip major surface, said nip defining a pass line of the mill, while
   (b) continuously advancing the first strip to the nip at a first line speed along a first free path over a first single roll spaced ahead of the nip with the top of said first roll disposed above the pass line of the mill such that said first strip advances upwardly to said first roll and then downwardly to said nip, and while
   (c) continuously advancing the second strip to the nip at a second line speed different from said first line speed along a second free path
      (i) from a locality, ahead of said first roll, at which said second strip is spaced away from said first strip,
      (ii) then around and in contact with a second single roll spaced between said locality and said first roll and
      (iii) thereafter, in smooth continuous contact with and substantially aligned with said first strip major surface, over said first roll and into said nip, said second strip moving longitudinally relative to said first strip while in contact with said first strip to cause the disruption of any oxide layers on the contacting surfaces of said first strip and said second strip to assure bonding.

2. A method according to claim 1, wherein said second free path is disposed above said first free path, and said second roll is so disposed that said second strip advances along said second free path under said second roll and is in full contact with the upwardly facing major surface of said first strip when the strips pass over said first roll.

3. A method according to claim 2, wherein the bottom of said second roll is disposed below the level of the top of the first roll.

4. A method according to claim 2, including the steps of continuously cladding the downwardly facing major surface of said first strip with a third aluminum strip in said mill by
   (a) continuously advancing said third strip to said nip at a third line speed different from said first line speed along a third free path
      (i) from a second locality, ahead of said second roll, at which said third strip is spaced below said first strip,
      (ii) then over and in contact with a third single roll spaced between said second locality and said second roll, and
      (iii) thereafter, in smooth continuous contact with and substantially aligned with said downwardly facing major surface of said first strip, over said first roll and into said nip, said third strip being longitudinally movable relative to said first strip throughout the extent of said third path; and
   (b) continuously passing said third strip through said nip concurrently with said first and second strips, substantially aligned longitudinally with said first strip and in contact with the downwardly facing major surface thereof, for warm rolling said third strip jointly with said first and second strips to bond said third strip to said first strip so as to constitute a cladding on said downwardly facing major surface of said first strip.

5. A method according to claim 1, wherein said second strip is maintained away from contact with said first strip at all points ahead of said first roll, and wherein said first strip, advancing in said first path, is at an elevated temperature sufficient to enable bonding of the two strips in the warm rolling step.

6. A method according to claim 1 or 5, wherein said first strip is an as-cast strip produced by continuous strip casting.

7. A method according to claim 5, wherein at least one of said strips is constituted of an aluminum alloy containing magnesium.

8. A method according to claim 1 or 5, wherein said first and second strips have the same alloy composition.

9. A method according to claim 1, wherein said first line speed is faster than said second line speed.

10. A method according to claim 1, wherein said first line speed is slower than said second line speed.

11. A method according to claim 1, including the step of further warm-rolling the bonded strips by passing them through a second warm-rolling mill beyond the first-mentioned warm-rolling mill.

12. A method according to claim 1, wherein said second strip is unwound from a coil at said locality, and said second line speed is maintained at a preselected value different from said first line speed by applying to said coil a level of back tension effective to maintain said second line speed at said value.

* * * * *